Jan. 19, 1954 W. D. POOLE 2,666,286
TILTABLY MOUNTED ROOT HARVESTER
Filed March 21, 1950 2 Sheets-Sheet 2
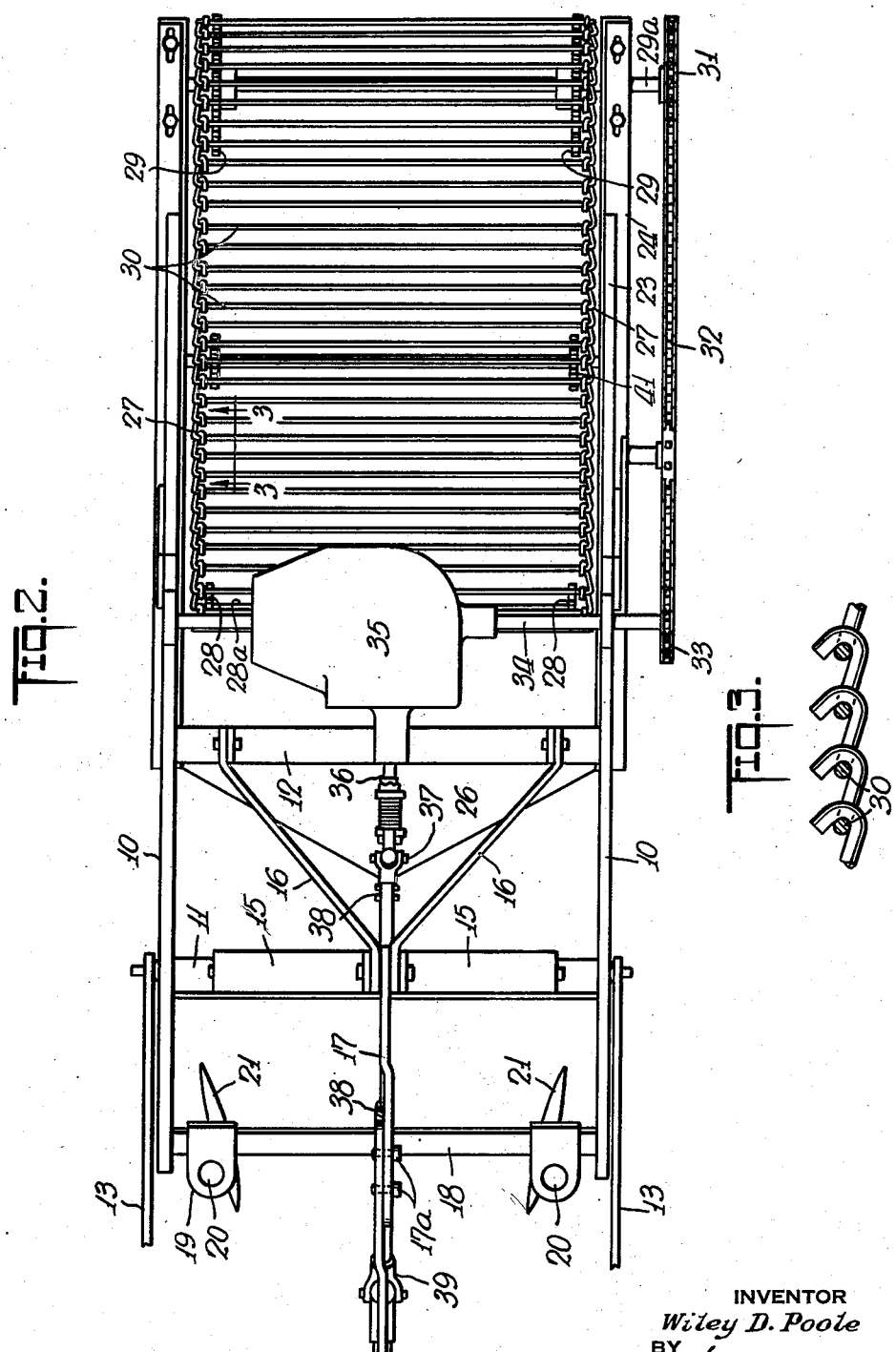
INVENTOR
*Wiley D. Poole*
BY
*Dean Fairbank + Hirsch*
ATTORNEYS Patented Jan. 19, 1954

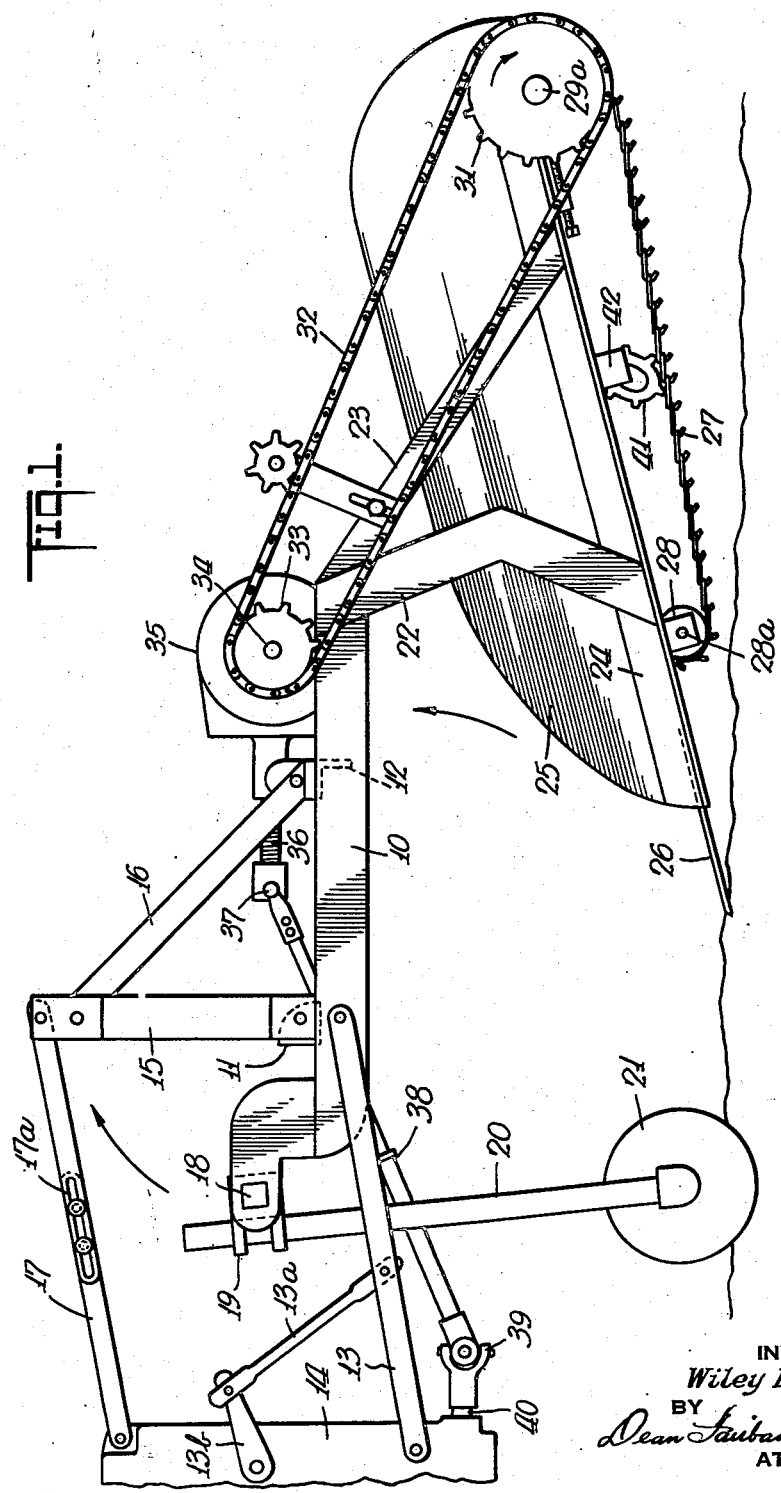

2,666,286

UNITED STATES PATENT OFFICE 2,666,286

TILTABLY MOUNTED ROOT HARVESTER

Wiley D. Poole, Baton Rouge, La., assignor to Board of Supervisors of Louisiana State University and Agricultural and Mechanical College, Baton Rouge, La.

Application March 21, 1950, Serial No. 150,987

3 Claims. (Cl. 55—51)

This invention relates to harvesters for root crops, of the type in which there are employed a cutter, coulter, plow or analogous device for removing or pushing sideways the soil at the sides of a row of plants, and also cutting vines, weeds, grass, etc., so that they will not tend to hang on the scoop, shovel or analogous device which lifts the roots and delivers them to a conveyor which separates the major portion of the soil therefrom and deposits them on the ground.

The term "root" as herein used is to be understood as including those parts of a plant which grow underground, and which constitute the desired crop. It includes the whole roots, such as beets, and desired parts which are directly connected to the roots, such as tubers and bulbs.

In harvesters of this general type it has been the practice heretofore to provide the apparatus with supporting wheels and means for simultaneously or independently adjusting the digger and the root lifting portions of the machine in respect to the frame, which is carried by supporting wheels. This has made it necessary for an operator to ride on the machine or walk along with it, so that he may raise or lower the operating parts, as occasion required.

The main object of the present invention is to provide a new type of apparatus which may be drawn by a tractor or other vehicle, and in which the cutting discs or other soil loosening parts and the root lifter are mounted on a frame which may be drawn along behind a tractor or other vehicle and controlled by one riding on the vehicle.

As an important feature of the present invention the cutter or soil loosener and the root lifter are so mounted on the frame of the apparatus and so connected at opposite ends of a pivotally supported part of the frame that as one moves upwardly the other moves downwardly. Thus, as the digger shovel meets with added resistance by encountering hard spots in the soil, it will cause an added dragging force on the shovel and have a tendency to move that end of the frame upward. Since it is pivotally supported, this upward movement of the rear part of the frame will cause the discs to move downward, which causes an additional force to be exerted on the disc, tending to push the rear part of the digger containing the shovel, back into the ground, thereby resulting in a stable operation of the machine.

As a further feature of the invention, means are provided for raising and lowering the pivotal point so that both the soil loosener and the root lifter may be raised above the ground, as for instance while traveling to and from the location of the crop. Such means also is employed to adjust the elevation of the soil loosener and the root lifter to any desired operating position in respect to the surface of the ground. When the lifter, due to its inclined position, tends to dig too deeply into the ground, the increased resistance causes it to swing upwardly. This upward movement of the rear part of the main frame causes the front part of the main frame ahead of the pivot point to cut more deeply into the soil, which results only in an increased lifting force on the front part of the frame, thereby forcing the rear part of the frame back downward.

As a further feature, the root lifter is so constituted that loose soil may fall through it, and means are provided for agitating the lifter during its operation to free the soil from the roots.

The apparatus in its preferred form embodies various other important features which will be apparent from or be pointed out in connection with the following description of the embodiment of the inventiton which is illustrated in the accompanying drawings.

In the drawings:

Fig. 1 is a side view of an apparatus embodying my invention.

Fig. 2 is a top plan view, and

Fig. 3 is a vertical section on the line 3—3 of Fig. 1, but on a larger scale.

In the construction illustrated there is provided a main frame including side bars 10 and transverse bars 11 and 12 adjacent to the front end. To each side bar 10 there are pivotally connected bars 13, which may be pivotally connected to the rear portion of a tractor 14, as shown at the left of Fig. 1. As a part of the frame there are upwardly converging bars 15 on the cross bar 11, and these are braced by bars 16 upwardly converging from the bar 12, and the upper ends of the bars 15 and 16 are connected together, and connected to the tractor by a second bar 17 which is substantially parallel to the bar 13, and which may automatically vary in length to a limited extent, as for instance by having a pair of fins 17a on one slidable in a slot in the other.

For lifting the apparatus above the ground and for holding it at the desired elevation in respect to the tractor, the bars 13 are connected by links 13a to an arm or arms 13b pivoted on the tractor. These arms 13b are pivoted, and at the pivotal connection there is provided means for swinging them and thereby lifting the entire apparatus free of the ground, or establishing the mean elevation of the rear ends of the bars 13 in respect to the ground.

These parts 13, 13a, 13b, 15, 16 and 17 do not per se form any novel part of my apparatus and may be those used for drawing other types of apparatus by a tractor and lifting and supporting it free of the ground; but as an important feature the traction bars 13 are pivoted to the frame in the rear of the soil loosener, and in front of the root gatherers, so that these parts may move up and down in reverse directions.

The front ends of the side bars 10 of the main frame of the apparatus are connected by a cross bar 18 on which are clamps 19 for holding depending rods 20 which are rotatably and vertically adjusted in respect to the frame, and which at their lower ends have soil looseners and weed cutters. These are shown as freely rotatable concave discs 21 which are set at the desired angles to the general direction of travel of the apparatus, as shown in Fig. 2. As the apparatus is pulled along by the tractor or other means these discs cut into and loosen the soil at opposite sides of a row of plants, push it sideways, and cut vines, weeds and grass. They also serve to support the front end of the frame and the parts carried thereby, and the weight of the front portion of the frame pushes the disc down into the soil.

The rear end of the frame has two pairs of downwardly extending diverging bars 22 and 23 rigid therewith and rigidly connected to the mechanism which lifts the roots and feeds them rearwardly. This includes parallel angle irons 24 provided with side walls 25 and connected at their front ends by an inclined shovel or scoop 26 which preferably comes to a point at the front end so that it will dig into the ground and lift the roots to the surface and deliver them rearwardly.

In the rear of the shovel or root lifter 26 there is provided means for mechanically moving the roots upwardly and rearwardly and then dropping them onto the ground in the rear of the apparatus. This means is shown as endless chains 27 mounted on sprocket wheels 28 and 29 and connected by transverse slats or bars 30 which carry the roots up along the scoop and drop them to the ground in the rear of the apparatus. The bars 30 are so spaced that loose dirt, but not the roots, may fall through. Either sprocket wheel may be adjustable to take up unnecessary slack.

The chains and slats may be driven in any suitable manner from the engine of the tractor. As shown, the rear sprockets 29 are mounted on a shaft 29a, and on this shaft is an additional sprocket wheel 31 connected by a chain 32 to a sprocket 33 on a transverse shaft 34. This shaft may comprise two sections extending from opposite sides to a gear box 35 having a drive shaft 36 connected through a universal joint 37 to a shaft 38 connected by a second universal joint 39 to a shaft 40 driven by the engine of the tractor. The shaft 38 may be formed of two telescoping sections keyed against relative rotation. Thus, as the apparatus is lifted by swinging the arms 13b, the two parts of the shaft 38 may telescope to the required extent, and without interrupting the transmission of power to the root conveyor.

Although the root conveyor may be formed of slats connected to a chain, a simple inexpensive construction is one in which the ends of each slat have loops encircling the next slat as shown in Fig. 3, so that the end portions of the slats constitute the chains.

In order to facilitate the freeing of soil from the roots and the discharge of it between the slats of the conveyor, means are provided for agitating the conveyor during its upward passage from the shovel. As shown in Fig. 1, this includes non-circular and preferably substantially elliptical idlers 41 rotatably mounted in brackets 42 on side bars or angle irons 24, and in such position that when the short radius portion of the idler is uppermost, its teeth will come between the transverse bars 30 when the latter rest on flanges of the angle irons 24. As the chains and slats in the upper run advance rearwardly, the idlers will rotate, and in each revolution will lift and then lower the slats. This in effect shakes the conveyor and rattles the dirt loose from the roots, and lets it fall down through the upper and lower runs of the conveyor and drop to the ground.

In my improved apparatus it will be noted that the frame may freely tilt back and forth to a limited extent about its pivotal connection to the draw bars 13, and that as the soil looseners 21 dig deeper into the soil, the shovel will rise, and as the soil loosener rises, the shovel or scoop descends. As the pivotal connection between the traction bars 13 and the frame 10 is approximately midway between the rear edges of the soil looseners 21 and the front end of the root digger or scoop 26, any up or down movement of either the soil looseners or the digger effects an approximately equal and opposite movement of the other. The extent of this tilting movement is limited by slot and pin connections 17a between the sections of the bars 17. It will also be noted that both the soil loosener and the shovel may be raised or lowered to the desired elevation by endwise movement of the pull bar 17. The entire apparatus may be lifted free of the ground and held at any desired elevation during traveling to and from a field.

Having thus described my invention what I claim as new and desire to secure by Letters Patent is:

1. A root harvester including a substantially horizontally disposed frame adapted to be moved endwise over and along a row of roots in the soil, a pair of rotatable soil looseners connected to and below the front end of said frame, a root digger and conveyor rearwardly spaced from said soil looseners and secured to and below the other end of said frame, a pair of fixed traction bars each having its rear end pivotally secured to said frame approximately midway between the rear edges of said soil looseners and the front end of said digger, whereby said frame may tilt and as either said soil looseners or said digger moves up or down the other moves in the opposite direction, and means for limiting the extent of the free tilting movement of the frame in respect to the traction bars.

2. A root harvester including a substantially horizontally disposed frame adapted to be moved endwise along and over a row of roots in the soil, a pair of rotatable discs disposed in planes at an angle to each other and carried by and below one end of said frame for pushing soil laterally away from the roots, a root digger and conveyor rearwardly spaced from said soil looseners and secured to and below the other end of said frame, a pair of fixed traction bars each having its rear end pivotally secured to said frame approximately midway between said soil looseners and said digger, whereby up or down movement of said soil looseners effects substantially equal down or up movement of said digger, and means for limiting the extent of the tilting movement of the frame in respect to the traction bars.

3. A root harvester including a substantially horizontally disposed frame adapted to be moved endwise over a row of roots, a pair of rotatable discs disposed in planes at an angle to each other and carried by and below one end of said frame for pushing soil laterally away from the roots, a root digger and conveyor spaced from said soil looseners and secured to and below the other end of said frame, a pair of fixed traction bars each having its rear end pivotally secured to said frame approximately midway between said soil looseners and said digger whereby up and down movement of said soil looseners effects substantially equal down and up movements of said digger, and means above and spaced from said traction bars for limiting the extent of the tilting movement of the frame in respect to the traction bars.

WILEY D. POOLE.

References Cited in the file of this patent
UNITED STATES PATENTS

| Number | Name | Date |
|---|---|---|
| 2,209,282 | Rodin | July 23, 1940 |
| 2,249,394 | Noffsinger | July 15, 1941 |
| 2,347,091 | Elliott | Apr. 18, 1944 |
| 2,468,639 | Sample | Apr. 26, 1949 |
| 2,526,396 | Nowlin | Oct. 17, 1950 |
| 2,537,198 | Wetzel et al. | Jan. 9, 1951 |